United States Patent
Thakkar et al.

(10) Patent No.: US 11,750,577 B2
(45) Date of Patent: *Sep. 5, 2023

(54) METHODS, SYSTEMS, AND MEDIA FOR PROTECTING AND VERIFYING VIDEO FILES

(71) Applicant: Google LLC, Mountain View, CA (US)

(72) Inventors: Anuj Thakkar, Sunnyvale, CA (US); Valeri Savvateev, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,103

(22) Filed: Jun. 17, 2022

(65) Prior Publication Data

US 2022/0329572 A1    Oct. 13, 2022

Related U.S. Application Data

(63) Continuation of application No. 16/927,144, filed on Jul. 13, 2020, now Pat. No. 11,368,438, which is a
(Continued)

(51) Int. Cl.
*H04L 9/40* (2022.01)
*H04N 21/6334* (2011.01)
(Continued)

(52) U.S. Cl.
CPC .......... *H04L 63/0428* (2013.01); *G06F 21/10* (2013.01); *G06F 21/602* (2013.01);
(Continued)

(58) Field of Classification Search
USPC .......................................................... 380/200
See application file for complete search history.

(56) References Cited

U.S. PATENT DOCUMENTS 6,418,421 B1 * 7/2002 Hurtado ................. H04W 4/02
705/54
7,035,468 B2    4/2006 Yogeshwar et al.
(Continued)

FOREIGN PATENT DOCUMENTS

CN    1183841    6/1998
CN    1706169    12/2005
(Continued)

OTHER PUBLICATIONS

Examination Report dated May 28, 2021 in EP Patent Application No. 18721589.2.
(Continued)

*Primary Examiner* — Kambiz Zand
*Assistant Examiner* — Mahabub S Ahmed
(74) *Attorney, Agent, or Firm* — Byrne Poh LLP

(57) ABSTRACT

Methods, systems, and media for protecting and verifying video files are provided. In some embodiments, a method for verifying video streams is provided, the method comprising: receiving, at a user device, a request to present a video that is associated with a video archive, wherein the video archive includes a file list, a signature corresponding to the file list, video metadata, a signature corresponding to the video metadata, and at least one encrypted video stream corresponding to the video, and wherein the file list indicates a plurality of files that are to be included in the video archive; verifying the signature corresponding to the file list; in response to determining that the signature corresponding to the file list has been verified, determining whether the plurality of files indicated in the file list are included in the video archive; in response to determining that the plurality of files indicated in the file list are included in the video archive, verifying the signature corresponding to the video metadata; in response to determining that the signature
(Continued)

corresponding to the video metadata has been verified, requesting a decryption key corresponding to the video stream; in response to receiving the decryption key, decrypting the encrypted video stream; and causing the decrypted video stream to be presented on the user device.

21 Claims, 4 Drawing Sheets

Related U.S. Application Data continuation of application No. 15/653,176, filed on Jul. 18, 2017, now Pat. No. 10,715,498.

(51) Int. Cl.
*H04N 21/4627* (2011.01)
*G06F 21/10* (2013.01)
*H04N 21/4405* (2011.01)
*H04L 9/32* (2006.01)
*H04N 21/8358* (2011.01)
*G06F 21/60* (2013.01)
*G06F 21/62* (2013.01)
*H04W 12/04* (2021.01)

(52) U.S. Cl.
CPC .......... *H04L 9/3247* (2013.01); *H04L 63/062* (2013.01); *H04N 21/4405* (2013.01); *H04N 21/4627* (2013.01); *H04N 21/63345* (2013.01); *H04N 21/8358* (2013.01); *G06F 21/62* (2013.01); *G06F 2221/2107* (2013.01); *H04L 2209/60* (2013.01); *H04L 2209/72* (2013.01); *H04W 12/04* (2013.01)

(56) References Cited

U.S. PATENT DOCUMENTS

| | | | |
|---|---|---|---|
| 7,124,190 B1 | 10/2006 | Moore | |
| 7,212,726 B2 | 5/2007 | Zetts et al. | |
| 7,770,004 B2* | 8/2010 | Herf | H04N 1/00217 713/162 |
| 8,099,369 B2* | 1/2012 | Fahrny | H04L 9/0825 380/31 |
| 8,180,708 B2* | 5/2012 | Hurtado | H04L 9/3249 713/168 |
| 8,560,405 B1* | 10/2013 | Buron | G06Q 30/0241 705/26.61 |
| 8,688,991 B1* | 4/2014 | Sunil | H04N 21/26613 713/176 |
| 8,707,375 B2* | 4/2014 | Hainline | H04N 21/23113 725/115 |
| 8,812,850 B2* | 8/2014 | Barton | H04N 21/25816 713/175 |
| 8,997,198 B1* | 3/2015 | Kelley | G06F 21/335 726/4 |
| 9,008,305 B2* | 4/2015 | Cureau | H04N 21/2541 380/201 |
| 9,288,445 B2* | 3/2016 | Taniguchi | G06Q 30/0251 |
| 9,385,999 B2* | 7/2016 | Kanungo | H04L 63/0457 |
| 9,684,728 B2* | 6/2017 | Lynn | G06F 16/955 |
| 10,171,845 B2* | 1/2019 | Hwang | H04N 21/25891 |
| 2002/0138843 A1* | 9/2002 | Samaan | H04N 7/17318 348/E7.071 |
| 2002/0194209 A1* | 12/2002 | Bolosky | H04L 9/3239 |
| 2003/0046238 A1* | 3/2003 | Nonaka | H04H 60/23 380/282 |
| 2003/0188183 A1* | 10/2003 | Lee | G06F 21/10 726/30 |
| 2003/0229797 A1* | 12/2003 | Newman | H04L 63/062 713/193 |
| 2004/0133923 A1* | 7/2004 | Watson | H04N 5/76 348/E7.071 |
| 2005/0144634 A1* | 6/2005 | Koo | H04N 7/1675 380/278 |
| 2007/0079342 A1* | 4/2007 | Ellis | H04N 21/47202 725/89 |
| 2007/0124602 A1* | 5/2007 | Wald | G11B 20/00731 726/28 |
| 2007/0130585 A1* | 6/2007 | Perret | H04N 21/4331 348/E7.071 |
| 2007/0150527 A1* | 6/2007 | Takakura | H04L 67/1095 |
| 2007/0174147 A1* | 7/2007 | Klein | H04N 21/8113 705/28 |
| 2007/0276951 A1 | 11/2007 | Riggs et al. | |
| 2008/0052783 A1* | 2/2008 | Levy | H04N 21/8113 348/E7.071 |
| 2008/0120482 A1* | 5/2008 | Jarvis | G06F 11/2069 714/42 |
| 2008/0178230 A1* | 7/2008 | Eyal | H04N 21/8352 725/86 |
| 2008/0313468 A1* | 12/2008 | Yoshikawa | H04L 63/0428 713/182 |
| 2009/0083781 A1* | 3/2009 | Yang | G06F 16/70 725/20 |
| 2009/0165031 A1* | 6/2009 | Li | H04N 21/4532 725/22 |
| 2009/0282432 A1* | 11/2009 | Hahnefeld | H04L 63/10 705/26.1 |
| 2010/0067705 A1* | 3/2010 | Boccon-Gibod | H04L 9/3271 380/285 |
| 2011/0078459 A1* | 3/2011 | Yoshioka | H04N 5/77 713/189 |
| 2011/0161668 A1* | 6/2011 | Sentinelli | H04L 63/12 713/168 |
| 2011/0179268 A1* | 7/2011 | Strom | H04L 9/3247 713/168 |
| 2012/0110119 A1* | 5/2012 | Levicki | H04N 21/8355 709/217 |
| 2012/0204024 A1* | 8/2012 | Augenstein | G06F 11/1453 713/150 |
| 2013/0013931 A1* | 1/2013 | O'Hare | H04L 9/3231 713/189 |
| 2013/0151655 A1* | 6/2013 | Wu | H04L 67/567 709/217 |
| 2013/0291060 A1 | 10/2013 | Moore | |
| 2014/0173287 A1 | 6/2014 | Mizunuma | |
| 2014/0196079 A1* | 7/2014 | Jannard | H04N 21/26613 725/31 |
| 2014/0270167 A1 | 9/2014 | Cureau et al. | |
| 2014/0289368 A1* | 9/2014 | Benitez | H04N 5/222 709/219 |
| 2014/0331330 A1* | 11/2014 | Abhijeet | H04N 21/23116 726/26 |
| 2015/0033023 A1* | 1/2015 | Xu | H04N 21/8355 713/176 |
| 2015/0058619 A1* | 2/2015 | Sweet | H04L 63/0428 713/155 |
| 2015/0143119 A1* | 5/2015 | Matsunaga | H04N 21/4363 713/168 |
| 2015/0163206 A1* | 6/2015 | McCarthy | H04L 63/104 726/4 |
| 2015/0312331 A1* | 10/2015 | Crocker | G06F 15/167 709/205 |
| 2016/0127895 A1* | 5/2016 | Bangole | H04W 12/0431 380/279 |
| 2016/0171186 A1* | 6/2016 | Marking | H04L 9/0894 713/189 |
| 2016/0188894 A1* | 6/2016 | Factor | G06F 21/602 713/165 |
| 2016/0277366 A1* | 9/2016 | Kanungo | H04L 63/10 |
| 2016/0292429 A1* | 10/2016 | Manville | G06F 3/0641 |
| 2016/0314052 A1* | 10/2016 | Gladwin | H04L 9/0894 |
| 2017/0005803 A1* | 1/2017 | Brownewell | G06F 16/248 |
| 2017/0061138 A1* | 3/2017 | Lambert | H04L 63/18 |
| 2017/0063551 A1* | 3/2017 | Quinn | H04L 9/0643 |
| 2017/0070302 A1* | 3/2017 | Tuscano | H04L 47/29 |
| 2017/0147830 A1* | 5/2017 | Park | G06F 21/121 |

(56) References Cited

U.S. PATENT DOCUMENTS

2017/0294212 A1* 10/2017 Allen .................... G11B 27/34
2019/0057115 A1*  2/2019 Liu ........................ G06F 21/10
2019/0057192 A1*  2/2019 Yoshimura .......... G06F 16/7844

FOREIGN PATENT DOCUMENTS

| CN | 101459826 | 6/2009 |
| CN | 102812473 | 12/2012 |
| CN | 104244026 | 12/2014 |
| CN | 105787357 | 7/2016 |
| EP | 2797333 | 10/2014 |

OTHER PUBLICATIONS

Examination Report dated Sep. 10, 2021 in IN Patent Application No. 201947048346.
International Search Report and Written Opinion dated Jul. 9, 2018 in International Patent Application No. PCT/US2018/027119.
Notice of Allowance dated Feb. 14, 2022 in U.S. Appl. No. 16/927,144.
Notice of Allowance dated Mar. 4, 2020 in U.S. Appl. No. 15/653,176.
Notice of Grant dated Jan. 6, 2022 in CN Patent Application No. 201880037097.X.
Office Action dated Mar. 29, 2019 in U.S. Appl. No. 15/653,176.
Office Action dated May 8, 2021 in CN Patent Application No. 201880037097.X.
Office Action dated Sep. 9, 2019 in U.S. Appl. No. 15/653,176.
Office Action dated Oct. 15, 2021 in U.S. Appl. No. 16/927,144.
Examination Report dated Jun. 29, 2023 in EP Patent Application No. 18721589.2.

* cited by examiner

METHODS, SYSTEMS, AND MEDIA FOR PROTECTING AND VERIFYING VIDEO FILES

CROSS-REFERENCE TO RELATED APPLICATIONS

This application is a continuation of U.S. patent application Ser. No. 16/927,144, filed Jul. 13, 2020, which is a continuation of U.S. patent application Ser. No. 15/653,176, filed Jul. 18, 2017, each of which is hereby incorporated by reference herein in its entirety.

TECHNICAL FIELD

The disclosed subject matter relates to protecting and verifying video files.

BACKGROUND

Content consumers frequently watch media content, such as videos, downloaded or streamed from a server, such as a server associated with a video sharing service. In such instances, the server may store the video, as well as information relating to the video, such as a title of the video, names of creators of the video, a description of the video, or thumbnail images related to the video. However, in some instances, the video or the associated information can become corrupted. For example, a malicious user may delete or modify portions of the information. In some such instances, it can be difficult to store videos and associated information securely, as well as detect when information has been modified and/or corrupted.

Accordingly, it is desirable to provide new methods, systems, and media for protecting and verifying video files.

SUMMARY

In accordance with various embodiments of the disclosed subject matter, methods, systems, and media for protecting and verifying video files are provided.

In accordance with some embodiments of the disclosed subject matter, a method for verifying video streams is provided, the method comprising: receiving, at a user device, a request to present a video that is associated with a video archive, wherein the video archive includes a file list, a signature corresponding to the file list, video metadata, a signature corresponding to the video metadata, and at least one encrypted video stream corresponding to the video, and wherein the file list indicates a plurality of files that are to be included in the video archive; verifying the signature corresponding to the file list; in response to determining that the signature corresponding to the file list has been verified, determining whether the plurality of files indicated in the file list are included in the video archive; in response to determining that the plurality of files indicated in the file list are included in the video archive, verifying the signature corresponding to the video metadata; in response to determining that the signature corresponding to the video metadata has been verified, requesting a decryption key corresponding to the video stream; in response to receiving the decryption key, decrypting the encrypted video stream; and causing the decrypted video stream to be presented on the user device.

In some embodiments, the method further comprises determining that there are no files included in the video archive that are not indicated in the file list.

In some embodiments, the method further comprises determining whether a video identifier associated with the video metadata matches a video identifier associated with the encrypted video stream.

In some embodiments, the video archive includes a thumbnail image associated with the encrypted video stream, and the thumbnail image is indicated in the file list.

In some embodiments, the method further comprises verifying a signature associated with the thumbnail image, wherein the video archive includes the signature associated with the thumbnail image.

In some embodiments, the video archive file includes indexing information corresponding to the encrypted video stream.

In accordance with some embodiments of the disclosed subject matter, a system for verifying video streams is provided, the system comprising a memory and a hardware processor that, when executing computer executable instructions stored in the memory, is configured to: receive, at a user device, a request to present a video that is associated with a video archive, wherein the video archive includes a file list, a signature corresponding to the file list, video metadata, a signature corresponding to the video metadata, and at least one encrypted video stream corresponding to the video, and wherein the file list indicates a plurality of files that are to be included in the video archive; verify the signature corresponding to the file list; in response to determining that the signature corresponding to the file list has been verified, determine whether the plurality of files indicated in the file list are included in the video archive; in response to determining that the plurality of files indicated in the file list are included in the video archive, verify the signature corresponding to the video metadata; in response to determining that the signature corresponding to the video metadata has been verified, request a decryption key corresponding to the video stream; in response to receiving the decryption key, decrypt the encrypted video stream; and cause the decrypted video stream to be presented on the user device.

In accordance with some embodiments of the disclosed subject matter, a non-transitory computer-readable medium containing computer executable instructions that, when executed by a processor, cause the processor to perform a method for verifying video streams is provided, the method comprising: receiving, at a user device, a request to present a video that is associated with a video archive, wherein the video archive includes a file list, a signature corresponding to the file list, video metadata, a signature corresponding to the video metadata, and at least one encrypted video stream corresponding to the video, and wherein the file list indicates a plurality of files that are to be included in the video archive; verifying the signature corresponding to the file list; in response to determining that the signature corresponding to the file list has been verified, determining whether the plurality of files indicated in the file list are included in the video archive; in response to determining that the plurality of files indicated in the file list are included in the video archive, verifying the signature corresponding to the video metadata; in response to determining that the signature corresponding to the video metadata has been verified, requesting a decryption key corresponding to the video stream; in response to receiving the decryption key, decrypting the encrypted video stream; and causing the decrypted video stream to be presented on the user device.

In accordance with some embodiments of the disclosed subject matter, a system for verifying video streams is provided, the system comprising: means for receiving, at a user device, a request to present a video that is associated with a video archive, wherein the video archive includes a file list, a signature corresponding to the file list, video metadata, a signature corresponding to the video metadata, and at least one encrypted video stream corresponding to the video, and wherein the file list indicates a plurality of files that are to be included in the video archive; means for verifying the signature corresponding to the file list; means for determining whether the plurality of files indicated in the file list are included in the video archive in response to determining that the signature corresponding to the file list has been verified; means for verifying the signature corresponding to the video metadata in response to determining that the plurality of files indicated in the file list are included in the video archive; means for requesting a decryption key corresponding to the video stream in response to determining that the signature corresponding to the video metadata has been verified; means for decrypting the encrypted video stream in response to receiving the decryption key; and means for causing the decrypted video stream to be presented on the user device.

In accordance with some embodiments of the disclosed subject matter, a method for storing video streams is provided, the method comprising: receiving, at a server, a video stream and video metadata corresponding to the video stream transmitted to the server by a user device; generating a file list that indicates a plurality of files that are to be included in a video archive file corresponding to the video stream, wherein the file list includes at least the video stream and the video metadata; generating a signature corresponding to the file list and a signature corresponding to the video metadata; encrypting the video stream using a key to generate an encrypted video stream; and storing the encrypted video stream, the file list, the video metadata, the signature corresponding to the file list, and the signature corresponding to the video metadata in the video archive file, wherein the video archive file is stored in association with the key used to generate the encrypted video stream.

In accordance with some embodiments of the disclosed subject matter, a system for storing video streams is provided, the system comprising a memory and a hardware processor that, when executing computer executable instructions stored in the memory, is configured to: receive, at a server, a video stream and video metadata corresponding to the video stream transmitted to the server by a user device; generate a file list that indicates a plurality of files that are to be included in a video archive file corresponding to the video stream, wherein the file list includes at least the video stream and the video metadata; generate a signature corresponding to the file list and a signature corresponding to the video metadata; encrypt the video stream using a key to generate an encrypted video stream; and store the encrypted video stream, the file list, the video metadata, the signature corresponding to the file list, and the signature corresponding to the video metadata in the video archive file, wherein the video archive file is stored in association with the key used to generate the encrypted video stream.

In accordance with some embodiments of the disclosed subject matter, a non-transitory computer-readable medium containing computer executable instructions that, when executed by a processor, cause the processor to perform a method for storing video streams is provided, the method comprising: receiving, at a server, a video stream and video metadata corresponding to the video stream transmitted to the server by a user device; generating a file list that indicates a plurality of files that are to be included in a video archive file corresponding to the video stream, wherein the file list includes at least the video stream and the video metadata; generating a signature corresponding to the file list and a signature corresponding to the video metadata; encrypting the video stream using a key to generate an encrypted video stream; and storing the encrypted video stream, the file list, the video metadata, the signature corresponding to the file list, and the signature corresponding to the video metadata in the video archive file, wherein the video archive file is stored in association with the key used to generate the encrypted video stream.

In accordance with some embodiments of the disclosed subject matter, a system for storing video streams is provided, the system comprising: means for receiving, at a server, a video stream and video metadata corresponding to the video stream transmitted to the server by a user device; means for generating a file list that indicates a plurality of files that are to be included in a video archive file corresponding to the video stream, wherein the file list includes at least the video stream and the video metadata; means for generating a signature corresponding to the file list and a signature corresponding to the video metadata; means for encrypting the video stream using a key to generate an encrypted video stream; and means for storing the encrypted video stream, the file list, the video metadata, the signature corresponding to the file list, and the signature corresponding to the video metadata in the video archive file, wherein the video archive file is stored in association with the key used to generate the encrypted video stream.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
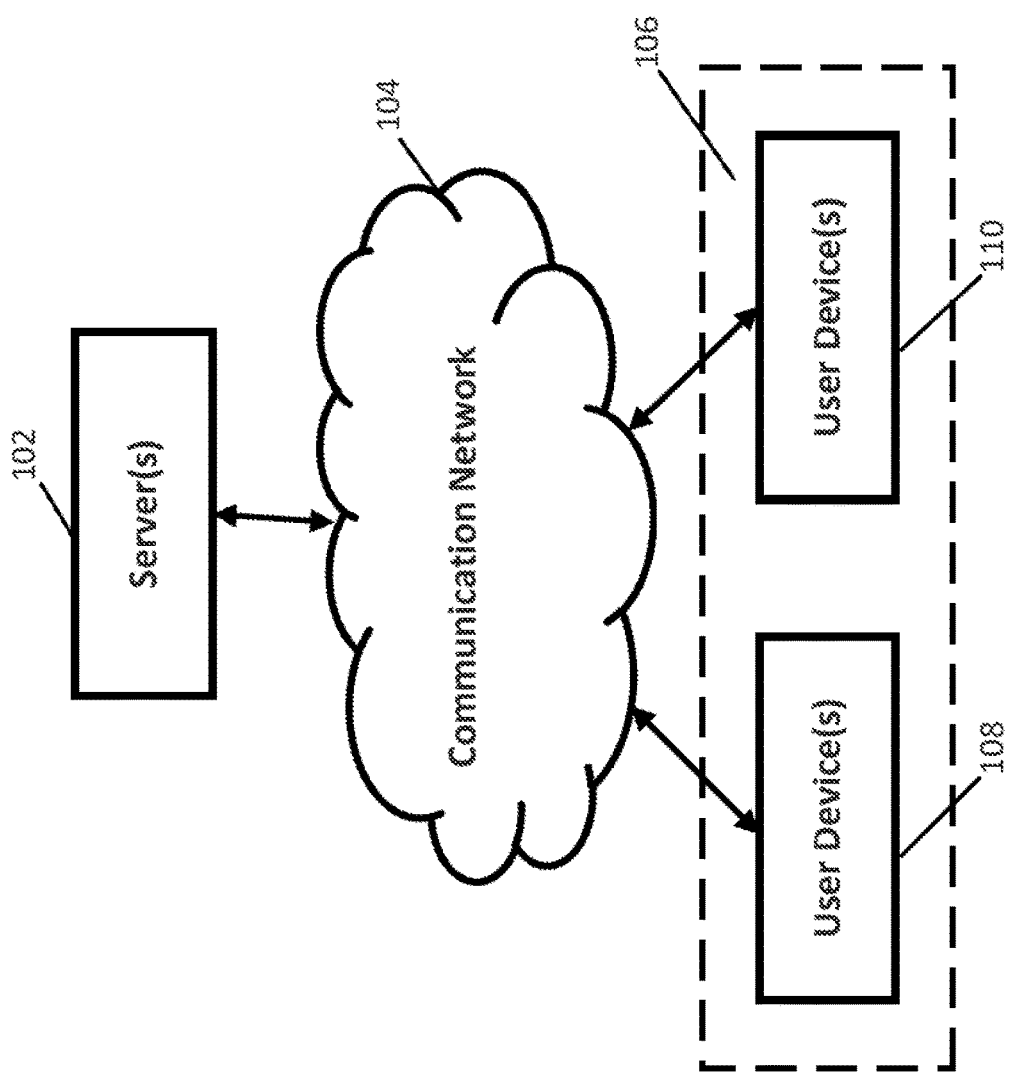
FIG. 1 shows a schematic diagram of an illustrative system suitable for implementation of mechanisms described herein for protecting and verifying video files in accordance with some embodiments of the disclosed subject matter.

In accordance with various embodiments, mechanisms (which can include methods, systems, and media) for protecting and verifying video files are provided.

In some embodiments, the mechanisms described herein can store a video stream in a video archive file that includes other files, such as metadata associated with the video stream, thumbnail content associated with the video stream, and/or any other suitable content. In some embodiments, the mechanisms can generate a file list that indicates the files that are included in the video archive file. For example, in some embodiments, the file list can indicate a name or location of the video stream, a name or location of a file that includes the metadata, a name or location of one or more thumbnail images, and/or any other suitable files. Additionally, in some embodiments, the mechanisms can generate a cryptographic signature for one or more of the files included in the video archive file, and the generated signature(s) can additionally be stored in the video archive file. For example, in some embodiments, a first signature can be generated for the file list, a second signature can be generated for the metadata, a third signature can be generated for thumbnail content, etc. In some embodiments, the video archive file can be stored on a server, for example, a server associated with a video sharing service.

In some embodiments, the mechanisms described herein can verify whether the video archive file has been corrupted or modified based on the contents of the video archive file. For example, in some embodiments, a user device that has received and/or stored the video archive file can verify the contents of the video archive file by verifying each of the cryptographic signatures included in the video archive file. As another example, in some embodiments, the user device can determine whether all of the files indicated in the file list included in the video archive file are present in the video archive file to determine that no information associated with the video archive file has been deleted. As yet another example, in some embodiments, the user device can determine that there are no files included in the video archive file that have not been indicated in the file list to determine that no files have been added to the video archive file. In some embodiments, the user device can verify that the video archive file has not been corrupted prior to causing the video stream to be presented on the user device.

Although the mechanisms described herein are generally described as relating to video content, in some embodiments, the techniques described can be used to store and/or verify any suitable type of media content, including live-streamed content, audio content (e.g., audio books, music files, and/or any other suitable type of audio content), electronic books, and/or any other suitable type of media content. Additionally, in some embodiments, the mechanisms described herein can be used to verify media content stored or received in any suitable manner, such as media content that is streamed by a user device, media content that is stored locally on a user device, media content that is stored on external memory associated with a user device, media content that is transferred from a first user device to a second user device, and/or any other suitable media content.

Turning to FIG. 1, an example 100 of hardware for verifying video files that can be used in accordance with some embodiments of the disclosed subject matter is shown. As illustrated, hardware 100 can include one or more servers 102, a communication network 104, and/or one or more user devices 106, such as user devices 108 and 110.

Server(s) 102 can be any suitable server(s) for storing and/or providing media content to user devices 106. For example, in some embodiments, server(s) 102 can store media content, such as videos, television programs, movies, live-streamed media content, audio content, and/or any other suitable media content. In some embodiments, server(s) 102 can store media content in an archive file that includes metadata associated with the media content, a thumbnail image associated with the media content, and/or any other suitable content, and can store a file list that indicates the files included in the archive file, as described below in more detail in connection with FIG. 4. In some embodiments, server(s) 102 can transmit an archive file that includes a media content stream and any associated files to a user device in response to receiving a request from the user device.

Communication network 104 can be any suitable combination of one or more wired and/or wireless networks in some embodiments. For example, communication network 104 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 106 can be connected by one or more communications links to communication network 104 that can be linked via one or more communications links to server(s) 102. The communications links can be any communications links suitable for communicating data among user devices 106 and server(s) 102 such as network links, dial-up links, wireless links, hard-wired links, any other suitable communications links, or any suitable combination of such links.

User devices 106 can include any one or more user devices suitable for requesting a media content item, receiving an archive file that includes a media content stream and associated information, verifying the received archive file, and/or any other suitable functions. For example, in some embodiments, user devices 106 can include a mobile device, such as a mobile phone, a tablet computer, a wearable computer, a laptop computer, a vehicle (e.g., a car, a boat, an airplane, or any other suitable vehicle) entertainment system, and/or any other suitable mobile device and/or any suitable non-mobile device (e.g., a desktop computer, and/or any other suitable non-mobile device). As another example, in some embodiments, user devices 206 can include a media playback device, such as a television, a projector device, a game console, desktop computer, and/or any other suitable non-mobile device.

Although server(s) 102 is illustrated as one device, the functions performed by server(s) 102 can be performed using any suitable number of devices in some embodiments. For example, in some embodiments, multiple devices can be used to implement the functions performed by server(s) 102.

Although two user devices 108 and 110 are shown in FIG. 1 to avoid over-complicating the figure, any suitable number of user devices, and/or any suitable types of user devices, can be used in some embodiments.

Figure 2:
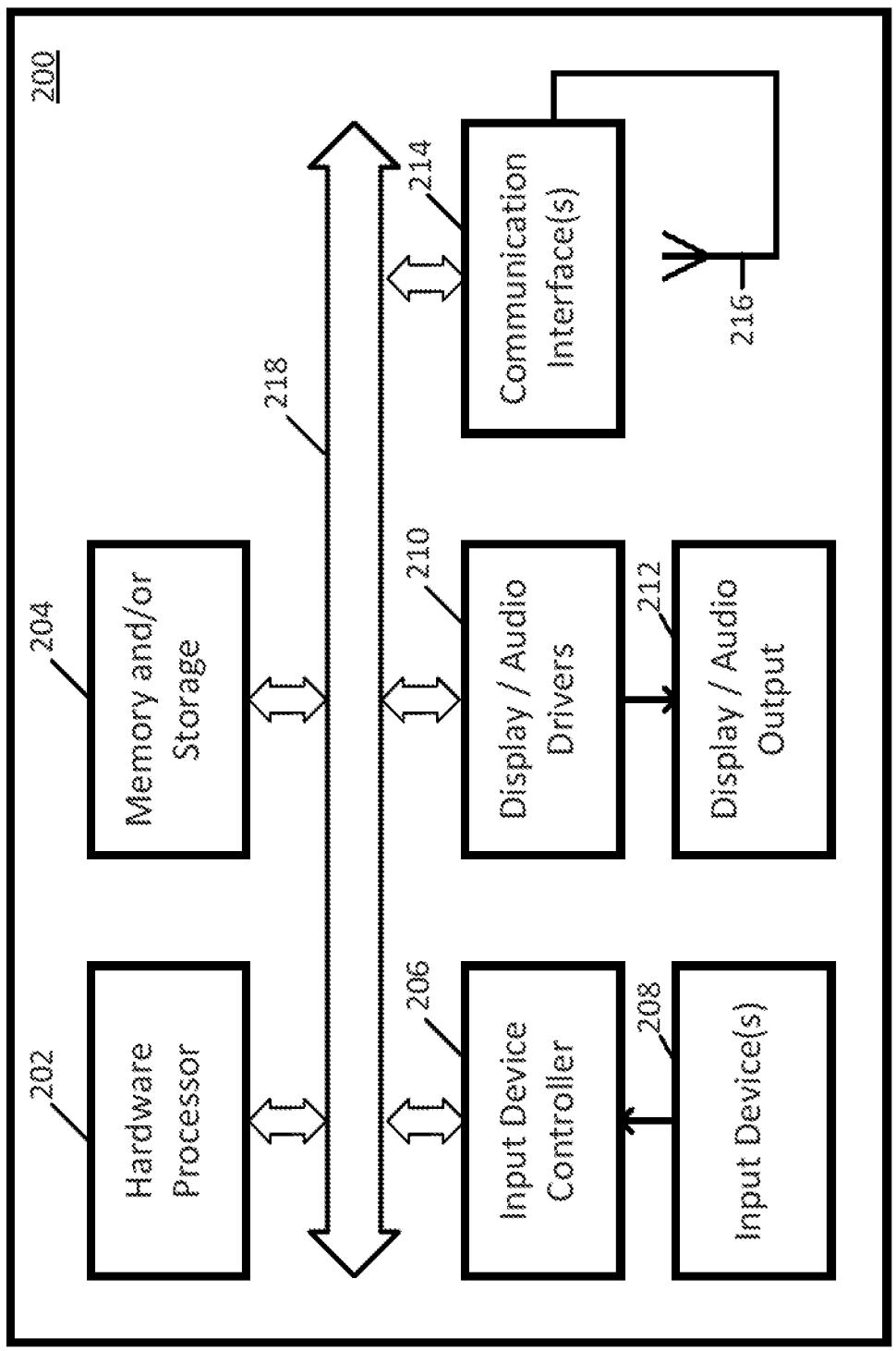
FIG. 2 shows a detailed example of hardware that can be used in a server and/or a user device of FIG. 1 in accordance with some embodiments of the disclosed subject matter.

Server(s) 102 and user devices 106 can be implemented using any suitable hardware in some embodiments. For example, in some embodiments, devices 102 and 106 can be implemented using any suitable general purpose computer or special purpose computer. For example, a mobile phone may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 202 can be controlled by a server program stored in memory and/or storage 204 of a server (e.g., such as one of server(s) 102). For example, in some embodiments, the server program can cause hardware processor 202 to store a media content stream in an archive file with associated information and transmit the archive file to a user device in response to receiving a request for the media content stream, and/or performing any other suitable actions. In some embodiments, hardware processor 202 can be controlled by a computer program stored in memory and/or storage 204 of user device 106. For example, the computer program can cause hardware processor 202 to receive an archive file that includes a media content stream and any other suitable files, verify the contents of the archive file, present the media content stream, and/or perform any other suitable actions.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 104) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
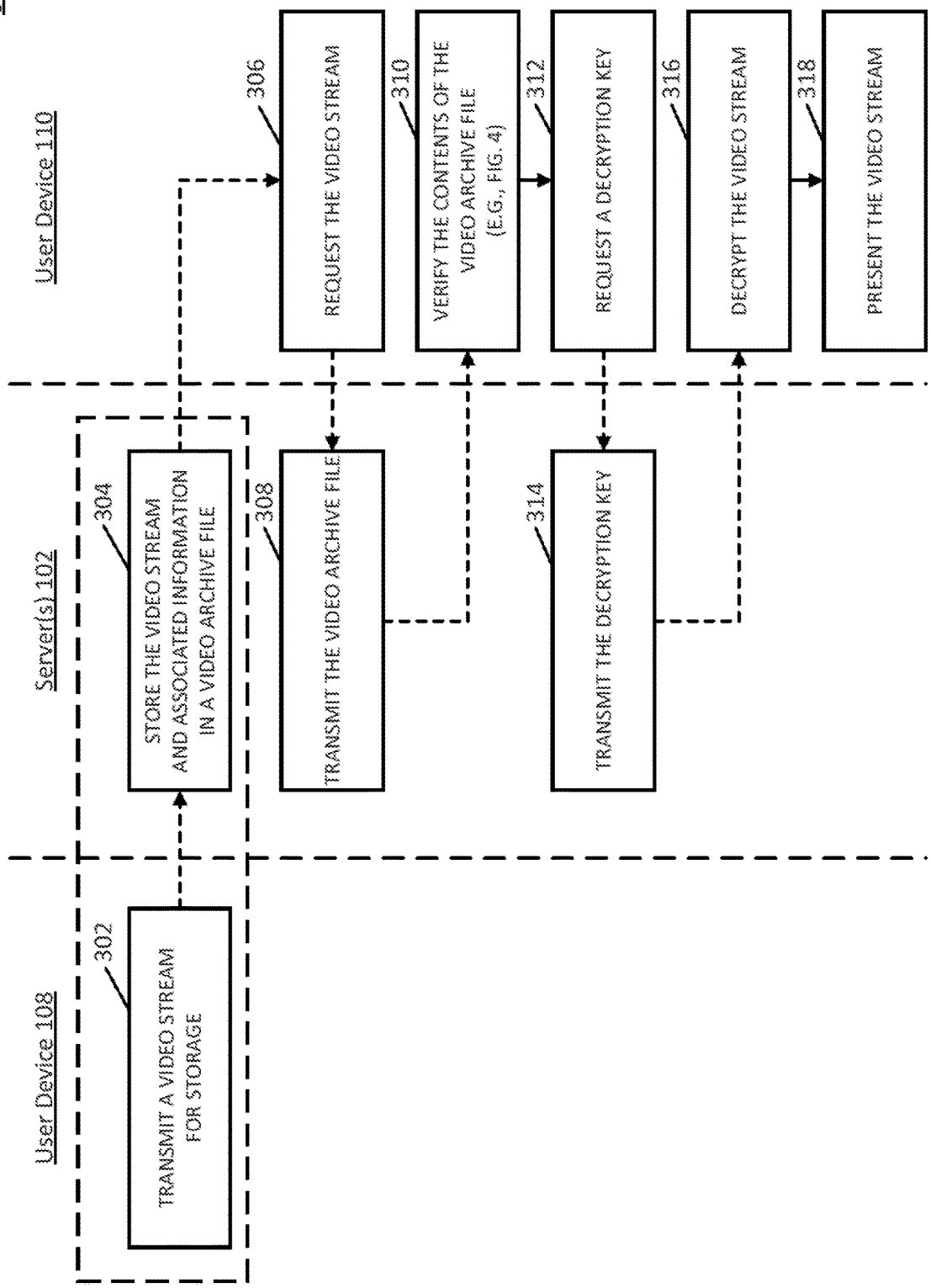
FIG. 3 shows an information flow diagram for storing video streams and verifying video files in accordance with some embodiments of the disclosed subject matter.

Turning to FIG. 3, an example 300 of an information flow diagram for storing a video stream in a video archive file and verifying, by a user device, a received video archive file, is shown in accordance with some embodiments of the disclosed subject matter. In some embodiments, blocks of information flow diagram 300 can be executed on a first user device (user device 108), server(s) 102, and a second user device (user device 110).

At 302, user device 108 can transmit a video stream to server(s) 102 for storage. In some embodiments, the video stream can be video content recorded by user device 108. Additionally or alternatively, in some embodiments, the video stream can be recorded by any other suitable device. In some embodiments, the video stream can be of any suitable duration. In some embodiments, user device 108 can additionally transmit any other suitable information associated with the video stream. For example, in some embodiments, user device 108 can transmit a title of the video stream, a name of a creator of the video stream, category or genre information, a description of the video stream, a thumbnail image to be associated with the video stream, and/or any other suitable information.

At 304, server(s) 102 can store the received video stream. In some embodiments, server(s) 102 can store the video stream in a video archive file that additionally includes files corresponding to other information associated with the video stream (e.g., metadata, thumbnail images, and/or any other suitable information). For example, in some embodiments, the additional information transmitted by user device 108 (e.g., title of the video stream, name of the creator of the video stream, keyword or category information, a description of the video stream, a number of views of the video stream, a date the video stream was uploaded to server(s) 102, duration information, channel information that indicates a collection to which the video stream is assigned or grouped, and/or any other suitable information) can be stored as metadata within a file of metadata. As another example, in some embodiments, each thumbnail image associated with the video stream can be stored as an image file within the video archive file. As yet another example, in some embodiments, indexing information associated with the video stream can be stored as a file within the video archive file. As a more particular example, in some embodiments, the indexing information can include a table of contents that indicates time points or frames at which different chapters or events associated with the video stream begin or end.

In some embodiments, the video archive file can be in any suitable format. For example, in some embodiments, the video archive file can be a container file of any suitable file format (e.g., ZIP, JAR, TAR, and/or any other suitable format) that includes the video stream and any other files. In some embodiments, the video archive file can be compressed in any suitable manner. Alternatively, in some embodiments, the video archive file can be uncompressed.

In some embodiments, server(s) 102 can generate a file list that indicates the files that are stored in the video archive file. For example, in an instance where the video archive file contains the video stream, a thumbnail image, and a file that includes metadata associated with the video stream, server(s) 102 can generate the file list to indicate the name and location of the video stream, the name and location of the thumbnail image, and the name and location of the metadata file. In some embodiments, server(s) 102 can include the file list in the video archive file.

In some embodiments, server(s) 102 can include signatures each associated with a file in the video archive file. For example, in some embodiments, server(s) 102 can include a signature corresponding to the metadata file, a signature for each thumbnail image file, a signature for the video stream, a signature for the file list, and/or any other suitable signatures. In some embodiments, server(s) 102 can generate each signature using any suitable technique or combination of techniques. For example, in some embodiments, server(s) 102 can generate the signatures using Digital Signature Algorithm (DSA), Elliptic Curve DSA (ECDSA), and/or using any other suitable technique(s). In some embodiments, any suitable parameters (e.g., parameters indicating a key length, and/or any other suitable parameters) used to generate the signatures can be included in the video archive file to allow a client device to verify the signatures.

In some embodiments, server(s) 102 can generate each signature using any suitable cryptographic hash function (e.g., SHA-224, SHA-256, and/or any other suitable hash function). In some such embodiments, server(s) 102 can use any suitable input to the hash function. For example, in some embodiments, the input to the hash function for each signature can be based on the filename of the file associated with the signature. As a more particular example, for the signature corresponding to a thumbnail image file named "thumbnail.jpg," and input to the hash function can include "thumbnail.jpg." Additionally or alternatively, in some embodiments, the input to the hash function for each signature can include a video identifier that indicates an identity of the video stream and/or the video archive file.

In some embodiments, server(s) 102 can encrypt the video stream prior to including the video stream in the video archive file. In some embodiments, server(s) 102 can encrypt the video stream using any suitable encryption techniques or algorithms. For example, in some embodiments, server(s) 102 can encrypt the video using any suitable symmetric encryption algorithm or asymmetric encryption algorithm. In some embodiments, server(s) 102 can store a key to be used by a user device to decrypt the video stream in connection with the video archive file (e.g., a public encryption key and/or a private encryption key). In some embodiments, server(s) 102 can store any suitable encryption information in the video archive file that can be used by a user device to request decryption keys and/or to decrypt the video stream, as described below.

Note that, in some embodiments, any other suitable information can be included in the video archive file, such as a version number of the video archive file, a date the video archive file was created, video identifier information, and/or any other suitable information. For example, in some embodiments, video identifier information indicating an identity of the video stream can be stored in the video metadata file as well as in a file that indicates indexing information about the video stream. In some such embodiments, the video identifier information can be verified between the video metadata file and the indexing information file to verify that both files are valid.

A specific example of a video archive file is shown below:
video_1_title.ytb
version_number
Meta
   filelist
   video.json
   streams.meta
   encryption.meta
   filelist.sig
   video.json.sig
   streams.meta.sig
Streams
   [video_id]-[itag].stream
Images
   thumbnail.jpg
   thumbnail.jpg.sig In this specific example, "video_1_title.ytb" can be the video archive file that includes the encrypted video stream, video metadata, a thumbnail image, a file list, and signatures for each file. For example, "filelist" can indicate the files in "video_1_title.ytb," "video.json" can include metadata associated with the video, which can be stored in any suitable format (e.g., JavaScript Object Notation, or JSON, encoded, and/or in any other suitable format), "streams.meta" can include information about the video stream such as indexing information, "encryption.meta" can include information that indicates how the video stream was encrypted and/or how the signatures were generated, and "thumbnail.jpg" can be the thumbnail image associated with the video stream. As another example, "filelist.sig," "video.json.sig," "streams.meta.sig," and "thumbnail.jpg.sig" can each be signatures associated with "filelist," "video.json," "streams.meta," and "thumbnail.jpg," respectively.

Note that, in some embodiments, server(s) 102 can create any suitable number of video archive files corresponding to video streams received from any suitable number of user devices. That is, in some embodiments, blocks 302 and 304 can be repeated at any suitable times. In some embodiments, the generated video archive files can be stored in memory 204 of server(s) 102.

At 306, user device 110 can request a particular video stream from server(s) 102. In some embodiments, the request can be received in response to any suitable action by a user of user device 110. For example, in some embodiments, the request can be in response to the user selecting a particular video or media content item for download to user device 110 and/or for streaming on user device 110. In some embodiments, the action can be received via a user interface associated with a media content sharing service corresponding to server(s) 102.

At 308, server(s) 102 can identify and transmit the video archive file corresponding to the received request to user device 110.

At 310, user device 110 can verify the contents of the video archive file. For example, in some embodiments, user device 110 can determine whether all of the files in the file list of the video archive file are included in the video archive file and that there are no additional files included in the video archive file that are not indicated in the file list. As another example, in some embodiments, user device 110 can verify the signature(s) of each file in the video archive file. More detailed techniques for verifying the contents of the video archive file are shown in and described below in connection with FIG. 4.

At 312, in response to verifying the contents of the video archive file, user device 110 can request a decryption key from server(s) 102 for decrypting the video stream included in the video archive file.

At 314, server(s) 102 can identify the decryption key corresponding to the video archive file and can transmit the identified decryption key to user device 110.

At 316, user device 110 can decrypt the video stream using the received decryption key. User device 110 can then cause the decrypted video stream to be presented on user device 110.

Note that, in some embodiments, user device 110 can receive the video archive file at 308 and can store the video archive file for presentation of the video stream when offline. In some such embodiments, user device 110 can verify the contents of the video archive file at 310 when the video archive file is received and/or prior to presentation of the video stream.

Figure 4:
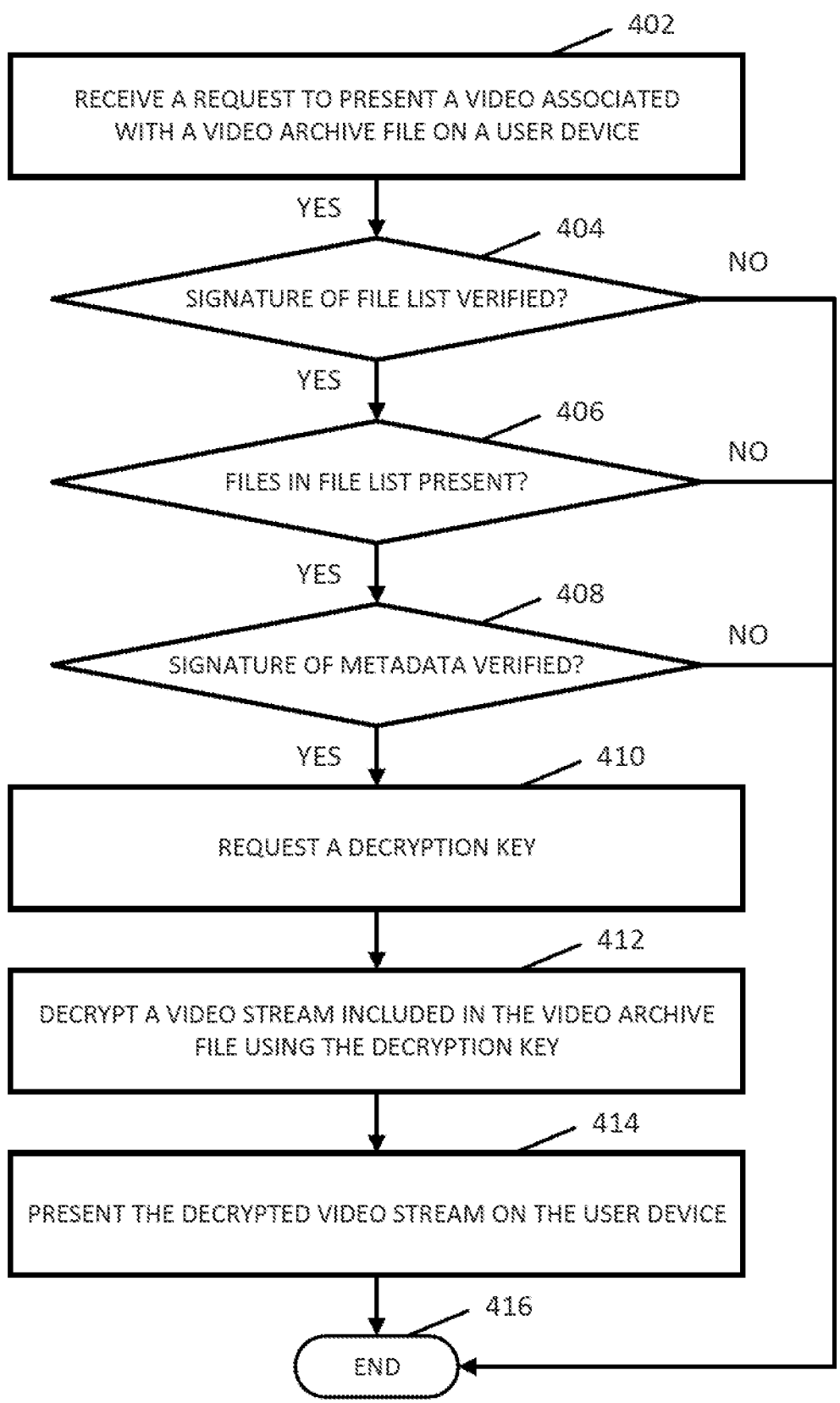
FIG. 4 shows an example of a process for protecting and verifying video files in accordance with some embodiments of the disclosed subject matter.

Turning to FIG. 4, an example 400 of a process for verifying a received video archive file and presenting a video stream included in the video archive file on a user device is shown in accordance with some embodiments of the disclosed subject matter.

Process 400 can begin by receiving a request to present a video stream associated with a video archive file at 402. In some embodiments, the request can be received in any suitable manner. For example, in some embodiments, the request can be received via a user interface to present a video that has been downloaded and stored on a user device. Note that, in some such embodiments, the video can be stored in any suitable location, such as local memory of the user device, on an external memory device associated with the user device (e.g., a hard drive, a Secure Digital, or SD card, and/or on any other suitable memory device). As another example, in some embodiments, the request can be received via a web page (e.g., a web page associated with a video sharing service, and/or any other suitable web page) to download and/or stream the video.

As described above in connection with block 302 of FIG. 3, in some embodiments, the video archive file can include any suitable files. For example, in some embodiments, the video archive file can include the video stream or a group of video streams that each includes a portion of the complete video stream. As another example, in some embodiments, the video archive file can include a file that indicates metadata associated with the video stream, such as a title of the video stream, a name of a creator of the video stream, a number of views of the video stream, a date the video stream was created, a description of the video stream, a duration of the video stream, and/or any other suitable information. As yet another example, in some embodiments, the video archive file can include one or more thumbnail images associated with the video stream (e.g., screen captures from the video stream, images or icons created or selected by a creator of the video stream, and/or any other suitable thumbnail images). Note that, in some embodiments, the thumbnail images can include any suitable images, icons, graphics, animations, videos, or other visual content. As still another example, in some embodiments, the video archive file can include a file list that indicates all of the files in the video archive file. Furthermore, in some embodiments, individual files included in the video archive file can be associated with a signature, and each of the signatures can additionally be included in the video archive file.

At 404, process 400 can verify a signature associated with the file list included in the video archive file. Process 400 can verify the signature using any suitable technique or combination of techniques. For example, in instances where the signature was generated by server(s) 102 using a particular algorithm (e.g., DSA, ECDSA, and/or any other suitable algorithm), process 400 can verify the signature using verification techniques specified by the algorithm. For example, in some embodiments, process 400 can perform a calculation or a series of calculations based on the algorithm used to generate the signature. As a more particular example, in some embodiments, process 400 can use the cryptographic hash function used to generate the signature to calculate one or more values used to verify the signature. In some embodiments, process 400 can use any other suitable information to calculate the one or more values used to verify the signature, such as parameters used to generate the signature (e.g., parameters based on a key length, parameters based on a hash function, randomly chosen values used to generate the signature, and/or any other suitable parameters), a video identifier associated with the video archive file and video stream, and/or any other suitable information. In some embodiments, process 400 can determine that the signature is valid in response to determining that a calculation based on the signature satisfies particular criteria, for example, criteria specified by the algorithm used to generate the signature. Note that, in some embodiments, information required and/or used to verify the signature that is based on information used to generate the signature by server(s) 102 can be indicated in the video archive file. For example, in some embodiments, the information can be included in a file included in the video archive file that indicates parameters used to generate each signature (e.g., key lengths, randomly chosen seed values, hash functions, and/or any other suitable information). As a more particular example, in some embodiments, the information can be stored in a file such as "encryption.meta," as described above in connection with block 302 of FIG. 3.

If, at 404, process 400 determines that the signature associated with the file list is not valid (e.g., "no" at 404), process 400 can end at block 416.

If, at 404, process 400 determines that the signature associated with the file list is valid (e.g., "yes" at 404), process 400 can proceed to block 406 and can determine whether all of the files indicated in the file list are included in the video archive file. For example, in instances where the file list indicates that one or more particular thumbnail images are to be included in the video archive file and/or a metadata file is to be included in the video archive file, process 400 can verify that the indicated thumbnail images and the indicated metadata file are included in the video archive file. In some embodiments, process 400 can additionally or alternatively determine whether additional files are included in the video archive file that are not indicated in the file list.

If, at 406, process 400 determines that not all of the files indicated in the file list are included in the video archive file and/or that additional files not indicated in the file list are included in the video archive file (e.g., "no" at 406), process 400 can end at block 416.

If, at 406, process 400 determines that all of the files indicated in the file list are included in the video archive file and/or that no additional files are included in the video archive file that were not indicated in the file list, process 400 can proceed to block 408 and can verify a signature associated with the metadata file. In some embodiments, process 400 can verify the signature associated with the metadata file in any suitable manner, for example, using the technique(s) described above in connection with block 404.

If, at 408, process 400 determines that the signature associated with the metadata file is not valid (e.g., "no" at 408), process 400 can end at block 416.

If, at 408, process 400 determines that the signature associated with the metadata file is valid (e.g., "yes" at 408), process 400 can proceed to block 410 and can request a decryption key to decrypt the video stream included in the video archive file. In some embodiments, process 400 can request the decryption key from a server that hosts the video archive file, and/or from any other suitable entity. Additionally or alternatively, in some embodiments, process 400 can request the decryption key from a Digital Rights Management (DRM) server. In some embodiments, the request for the decryption key can include any suitable information, such as a video identifier associated with the video archive file.

In response to receiving the decryption key, process 400 can decrypt the video stream included in the video archive file. In instances where multiple video streams are included in the video archive file (e.g., where each video stream is a chunk or portion of a larger video stream), process 400 can decrypt each video stream individually using the decryption key or different decryption keys. In some embodiments, process 400 can decrypt the video stream using any suitable technique or algorithm. For example, in some embodiments, process 400 can decrypt the video stream using the decryption key received from the server according to any suitable decryption algorithm. Note that, in some embodiments, process 400 can perform any suitable additional verification of decrypted portions of the video stream. For example, in some embodiments, process 400 can verify decrypted stream bytes using a signature included in the video archive file and/or a signature computed using the decrypted stream bytes (e.g., a signature associated with the decrypted video stream generated by server(s) 102, and/or any other suitable signature).

At 414, process 400 can cause the decrypted video stream to be presented on the user device. In some embodiments, the decrypted video stream can be presented in any suitable manner. For example, in some embodiments, the decrypted video stream can be presented within a video player window that includes any suitable controls (e.g., a volume control, a fast-forward control, a rewind control, a pause control, and/or any other suitable controls) for manipulating playback of the video stream.

Process 400 can end at 416.

Note that, in some embodiments, process 400 can perform any other suitable verification procedures prior to decrypting the video stream. For example, in some embodiments, process 400 can determine whether a signature associated with a file that indicates indexing information for the video stream is valid, similarly to as described above in connection with block 404. As another example, in some embodiments, the indexing information file and the metadata file can each include a video identifier that indicates identifying information for the video stream, and process 400 can determine that the video identifier in the indexing information file matches the video identifier in the metadata file.

Additionally, note that, in some embodiments, in instances where process 400 terminates at block 416 in response to a determination that at least one part of the video archive file is invalid (e.g., "no" at 404, 406, and/or 408), process 400 can present a message that indicates that the content of the video archive file was determined to be invalid. For example, in some embodiments, process 400 can present a message indicating that the video archive file was likely modified (e.g., in response to a determination that additional files were added to the video archive file, that files were missing from the video archive file, and/or any other suitable information) and/or that the video archive file was likely corrupted.

In some embodiments, at least some of the above described blocks of the processes of FIGS. 3 and 4 can be executed or performed in any order or sequence not limited to the order and sequence shown in and described in connection with the figures. Also, some of the above blocks of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EE-PROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for protecting and verifying video files are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for verifying video content, the method comprising:
receiving, at a user device, a request to present a video that is associated with a video archive, wherein the video archive includes a file list, a signature corresponding to the file list, and encrypted content corresponding to the video, and wherein the file list indicates a plurality of files that are to be included in the video archive;
verifying the signature corresponding to the file list;
in response to determining that the signature corresponding to the file list has been verified, determining whether the plurality of files indicated in the file list match files included in the video archive; and
in response to determining that the plurality of files indicated in the file list matches files included in the video archive, requesting a decryption key for decrypting the encrypted content.

2. The method of claim 1, wherein determining that the plurality of files indicated in the file list matches the files included in the video archive further comprises determining whether a file of the plurality of files is missing from the video archive.

3. The method of claim 1, wherein determining that the plurality of files indicated in the file list matches the files included in the video archive further comprises determining whether a file that is not included in the plurality of files is included in the video archive.

4. The method of claim 1, further comprising verifying a signature corresponding to video metadata prior to determining whether the plurality of files indicated in the file list match files included in the video archive, wherein the video metadata and the signature corresponding to the video metadata are included in the video archive.

5. The method of claim 1, wherein the encrypted content was received at a server from a second user device, and wherein the video archive is received by the user device from the server.

6. The method of claim 5, further comprising verifying a signature corresponding to video metadata, wherein the video metadata indicates information about the second user device, and wherein the video metadata and the signature corresponding to the video metadata are included in the video archive.

7. The method of claim 1, further comprising inhibiting a request for the decryption key for decrypting the encrypted content in response to determining that the plurality of files indicated in the file list does not match the files included in the video archive.

8. A system for verifying video content, the system comprising:
a hardware processor that:
receives, at a user device, a request to present a video that is associated with a video archive, wherein the video archive includes a file list, a signature corresponding to the file list, and encrypted content corresponding to the video, and wherein the file list indicates a plurality of files that are to be included in the video archive;
verifies the signature corresponding to the file list;
in response to determining that the signature corresponding to the file list has been verified, determines whether the plurality of files indicated in the file list match files included in the video archive; and
in response to determining that the plurality of files indicated in the file list matches files included in the video archive, requests a decryption key for decrypting the encrypted content.

9. The system of claim 8, wherein determining that the plurality of files indicated in the file list matches the files included in the video archive further comprises determining whether a file of the plurality of files is missing from the video archive.

10. The system of claim 8, wherein determining that the plurality of files indicated in the file list matches the files included in the video archive further comprises determining whether a file that is not included in the plurality of files is included in the video archive.

11. The system of claim 8, wherein the hardware processor further verifies a signature corresponding to video metadata prior to determining whether the plurality of files indicated in the file list match files included in the video archive, wherein the video metadata and the signature corresponding to the video metadata are included in the video archive.

12. The system of claim 8, wherein the encrypted content was received at a server from a second user device, and wherein the video archive is received by the user device from the server.

13. The system of claim 12, wherein the hardware processor further verifies a signature corresponding to video metadata, wherein the video metadata indicates information about the second user device, and wherein the video metadata and the signature corresponding to the video metadata are included in the video archive.

14. The system of claim 8, wherein the hardware processor further inhibits a request for the decryption key for decrypting the encrypted content in response to determining that the plurality of files indicated in the file list does not match the files included in the video archive.

15. A non-transitory computer-readable medium containing computer executable instructions that, when executed by a processor, cause the processor to perform a method for verifying video content, the method comprising:
receiving, at a user device, a request to present a video that is associated with a video archive, wherein the video archive includes a file list, a signature corresponding to the file list, and encrypted content corresponding to the video, and wherein the file list indicates a plurality of files that are to be included in the video archive;
verifying the signature corresponding to the file list;
in response to determining that the signature corresponding to the file list has been verified, determining whether the plurality of files indicated in the file list match files included in the video archive; and
in response to determining that the plurality of files indicated in the file list matches files included in the video archive, requesting a decryption key for decrypting the encrypted content.

16. The non-transitory computer-readable medium of claim 15, wherein determining that the plurality of files indicated in the file list matches the files included in the video archive further comprises determining whether a file of the plurality of files is missing from the video archive.

17. The non-transitory computer-readable medium of claim 15, wherein determining that the plurality of files indicated in the file list matches the files included in the video archive further comprises determining whether a file that is not included in the plurality of files is included in the video archive.

18. The non-transitory computer-readable medium of claim 15, wherein the method further comprises verifying a signature corresponding to video metadata prior to determining whether the plurality of files indicated in the file list match files included in the video archive, wherein the video metadata and the signature corresponding to the video metadata are included in the video archive.

19. The non-transitory computer-readable medium of claim 15, wherein the encrypted content was received at a server from a second user device, and wherein the video archive is received by the user device from the server.

20. The non-transitory computer-readable medium of claim 19, wherein the method further comprises verifying a signature corresponding to video metadata, wherein the video metadata indicates information about the second user device, and wherein the video metadata and the signature corresponding to the video metadata are included in the video archive.

21. The non-transitory computer-readable medium of claim 15, wherein the method further comprises inhibiting a request for the decryption key for decrypting the encrypted content in response to determining that the plurality of files indicated in the file list does not match the files included in the video archive.

* * * * *